May 6, 1952   H. WOLDMAN ET AL   2,595,319
APPARATUS AND MACHINE FOR REDUCING TUBE ENDS
Filed April 7, 1945
FIG. 1.
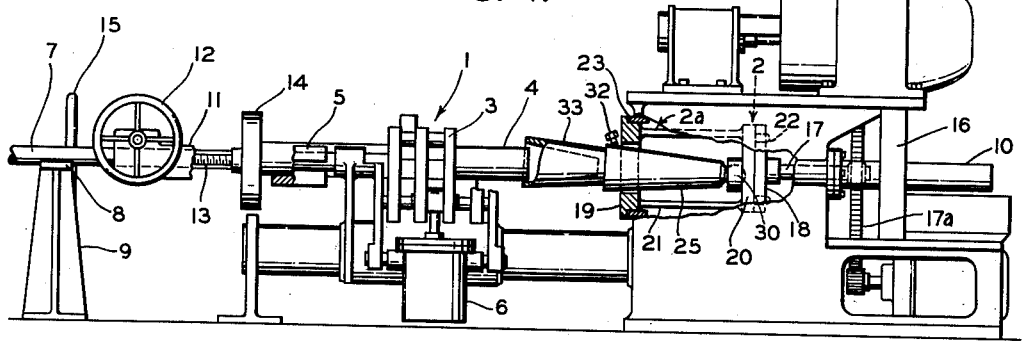
FIG. 2.
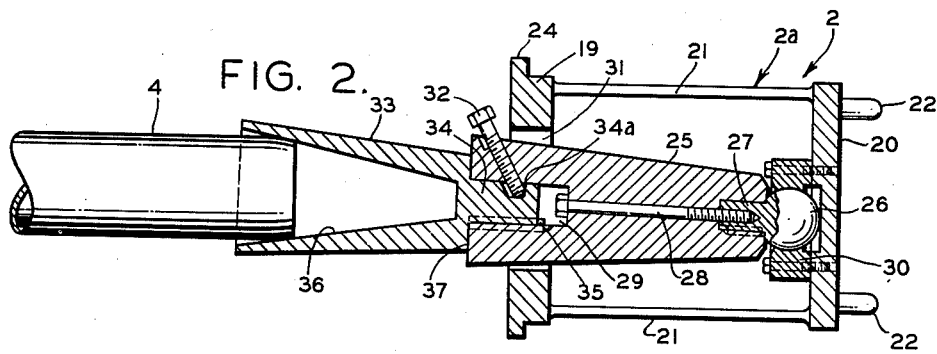
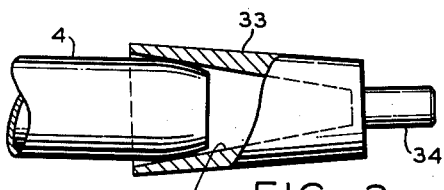
FIG. 3.
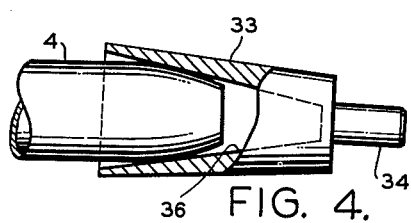
FIG. 4.
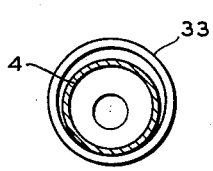
FIG. 5.
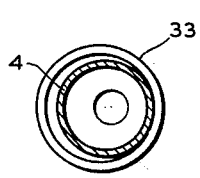
FIG. 6.
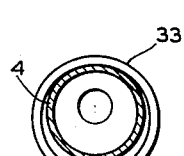
FIG. 7.
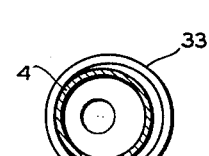
FIG. 8.
INVENTORS
HENRY WOLDMAN
EDWARD D. McDONOUGH
BY Ralph Chappell
ATTORNEY Patented May 6, 1952

2,595,319

UNITED STATES PATENT OFFICE 2,595,319

APPARATUS AND MACHINE FOR REDUCING TUBE ENDS

Henry Woldman, Roxbury, and Edward D. McDonough, Medford, Mass.

Application April 7, 1945, Serial No. 587,196

6 Claims. (Cl. 78—14)

(Granted under the act of March 3, 1883, as amended April 30, 1928; 370 O. G. 757)

Our invention relates to an apparatus and machine for reducing tube ends. It has to do, more specifically, with a machine for reducing the diameters of the ends of tubes or pipes to permit their being joined to the ends of other tubes or pipes of smaller diameter.

It has been customary to reduce pipe ends by the use of a machine including an attachment comprising rollers which engage the end of the pipe at diametrically opposed points and which are revolved around the axis of the pipe. The rollers are spaced apart by a distance less than the diameter of the end of the pipe and equal to the desired diameter to be produced on the pipe. The rollers are tapered on their outer ends to guide the end of the pipe into position therebetween as the pipe is forced, axially relatively to the rollers, into association therewith.

We have found in actual practice that this machine is not suitable for operating upon many types of pipe. Wrought iron pipe in many instances, will be cracked by the roller attachment in the reduction process. Welded pipe will often have its welded seams broken. Furthermore, in reducing galvanized pipe, the galvanizing will often adhere to the rollers and be stripped from the end of the pipe. We have also found that in reducing pipe ends with the roller attachment, considerable time is required for the operation.

One of the objects of our invention is to provide an apparatus which will quickly and effectively reduce pipe ends to desired diameters.

Another object of our invention is to provide such apparatus which is capable of operating on pipes made of any of the commonly used materials or of any of the usual structures without injury thereto.

Another object of our invention is to provide apparatus of the type indicated of simple, rugged, and low-cost construction.

In its preferred form, our invention contemplates the provision of a pipe-reducing attachment adapted to be applied to a machine comprising mainly a work-holding unit and a toolholding unit. These two units are supported for relative longitudinal movement. On the toolholding unit we provide a hollow conical forming member which is adapted to receive the end of the pipe, which, in turn, is adapted to be clamped on the work-holding unit. The work-holding unit and tool-holding unit are moved relative to each other in such a manner that the pipe is gradually forced into the conical forming member. This member will be of a preselected diameter and taper. We also provide means associated with the tool-holding unit for causing the conical member to wobble on the end of the pipe. This wobbling action of the conical forming member on the end of the pipe, as it is forced into the conical member, produces a metal bending or forging operation which will effectively reduce the end of the pipe without injury thereto.

The preferred embodiment of our invention is illustrated in the accompanying drawing wherein similar characters of reference designate corresponding parts and wherein:

Fig. 1 is a side elevational view, partly broken away, of a machine in which our invention has been embodied, the pipe being illustrated as having its end just entering the conical forming member.

Fig. 2 is a longitudinal sectional view through the conical forming member and associated parts, the end of the pipe being shown forced further into the forming member.

Figs. 3 and 4 are similar views showing the pipe being forced progressively further into the forming member.

Figs. 5 to 8 inclusive are end views of the conical forming member and associated pipe, the pipe being shown in cross-section, illustrating the wobbling action of the forming member on the end of the pipe.

With reference to the drawing, we illustrated our invention as applied to a machine which comprises mainly a work-holding unit 1 and a tool-holding unit 2.

The unit 1 is of the usual type and will not be described in great detail. It includes a clamp 3 which is adapted to receive the pipe indicated by the numeral 4. It also includes a supporting cradle 5. The clamp 3 and cradle 5 receive and support the pipe 4. The clamp 3 is opened and closed by connections comprising a piston rod arranged to slide vertically in a hydraulic cylinder 6.

The cradle 5 and clamp 3 are supported by a pair of longitudinally extending rods, only one of them being shown and indicated by the numeral 7. These rods are supported on cradles 8 formed on the upper ends of standards 9. The rods 7 may be moved longitudinally by any suitable means, such as hydraulic cylinders 10 into which they may extend, or by mechanical means.

A carriage 11 is also supported on the rods 7 and may move longitudinally thereon. This carriage 11 may be thus adjusted on the rods 7 by operating a handwheel 12. The carriage 11 carries a screw 13 which has a disk 14 on its inner end. This disk 14 is adapted to engage the outer end of the pipe 4 when it is positioned on the cradle 5 and clamp 3. The screw 13 is operated by a hand-wheel 15 to move disk 14 longitudinally of the carriage 11.

The unit 2, in its main structure, is also of the usual type. It includes a frame 16 in which a shaft 17 is rotatably mounted in axial alignment with the pipe 4 when the latter is clamped on the unit 1. This shaft is driven by a suitable gear-reduction drive which is designated by the numeral 17a. On its inner end the shaft 17 carries a disk 18 which is keyed thereto.

The unit 2 includes a tool-holding cage 2a, illustrated best in Fig. 2. The cage comprises a bearing disk 19 and a driving disk 20 which are joined together as a single unit by a plurality of circumferentially spaced rods 21. The disk 20 abuts the driving disk 18, carried by shaft 17, and carries oppositely disposed pins 22 that project from one face thereof. These pins are adapted to extend into cooperating openings in disk 18 when the disks 18 and 20 are in face contact, as shown in Fig. 1. The disk 19 is carried in a radial thrust bearing 23 carried by the frame 16. The disk 19 is provided with a bearing flange 24 which overlaps the outer edge of ring 23.

The cage 2a carries an arbor 25 of frustoconical form. The smaller end of this arbor carries a ball 26 which has a cylindrical extension 27 disposed in a socket formed therein. The ball is held in position by a screw bolt 28, extending through arbor 25 from a tool-receiving socket 29 formed in the opposite end thereof. The ball 26 is disposed in a ball-socket formed in a retaining block 30 that is bolted to the inner face of the disk 20. The block 30 is disposed eccentrically of disk 20 so that the ball-socket, and therefore the ball 26, will be disposed eccentrically thereof. The larger end of arbor 25 extends through a circular opening 31 in the disk 19, which opening is considerably larger than the arbor 25. The arbor 25 extends beyond the disk 19 for a considerable distance. The exposed end of arbor 25 carries an angularly disposed set-screw 32 which extends into the tool-receiving socket 29.

The arbor 25 is adapted to carry a hollow conical forming member 33. Extending from the inner end of this member 33 is a cylindrical shank 34. The shank 34 is adapted to fit into the socket 29. A key 35 is carried by the arbor 25 in socket 29 and is adapted to extend into a cooperating spline in shank 34. Also formed in the periphery of shank 34 is a socket 34a for receiving the inner end of screw 32. The socket 34a is so shaped and located, that when screw 32 extends thereinto and is tightened, the annular shoulder 37, formed on member 33, will firmly abut the outer edge of arbor 25. The key 35 will prevent relative rotation of members 33 and 25. It will be apparent that member 33 may be removed and replaced quickly with a similar member of different size.

The conical member 33 may be cast or forged from suitable metal, or may be made in any other suitable manner. It is provided with a continuously tapering inner surface 36 which is preferably a fairly sharp tapering surface. The outer or open end of member 33 will be of a diameter larger than the end of the pipe to be received and reduced. The angle of taper of surface 36 will vary with the extent of reduction and the length of the final reduced portion desired; but we have found that a taper of approximately 4″–6″ to the foot is most satisfactory under ordinary conditions.

In reducing the diameter of a pipe-end, we mount a pipe such as pipe 4, on the unit 1 in the manner indicated in Fig. 1. We also mount on the unit 2 a conical forming member 33 of suitable size to reduce the end of the pipe as desired. The initial position of the end of the pipe axially of the member 33 will be adjusted by operating the hand wheels 12 and 15. The disk 14 will be in contact with the outer end of the pipe. The unit 10 may then be actuated to gradually feed the pipe into the member 33.

The cage 2a is revolved about its axis and will rotate the members 25 and 33 therewith as long as member 33 does not contact the pipe. However, as soon as the end of the pipe contacts with the surface 36 of forming member 33, the rotation of member 33 with the cage structure 2a will cease. At this time, the inner end of arbor 25 will revolve around the axis of the cage 2a due to its eccentric connection with disk 20. At the same time, the arbor 25 will rock about the ball and socket connection 26. This, in turn, will create a rocking or wobbling action of member 33 on the end of the pipe as it is being forced thereinto. The opening 31 is sufficiently large to permit this action and during this action the arbor 25 will not contact the edge of the opening.

The outer portion of member 33 will be caused to gyrate about the axis of the pipe. The wobbling or gyration of the member 33 about the end of the pipe is illustrated diagrammatically in Figs. 5 to 8. The area of contact will extend only a relative short distance circumferentially of the pipe, at any particular instant, and this area of contact progresses around the circumference of the pipe. This action will cause the end of the pipe to be bent or forced inwardly at progressive circumferential positions. It will be understood, that simultaneously with this action, the pipe continues to be forced into the member 33, as illustrated in Figs. 2 to 4. We prefer that the taper of the surface 36 be fairly sharp so that the desired reduction can be obtained with limited longitudinal contact. This will permit the member 33 to more effectively rock or wobble on the end of the pipe.

The pipe will be forced into the member 33 a distance sufficient to produce the required reduction. If a long reduced end is desired on the pipe, it may be desirable in some instances, to force the pipe completely to the small end of the member 33. The diameter of the forming chamber at the small end, however, will be slightly greater than the smallest diameter of the reduced end of the pipe owing to the effect of the wobbling or rocking of the forming member. For most reducing jobs, however, the member 33 will be of such a taper that the end of the pipe may be brought down to the desired smaller diameter during a short travel of the pipe into the forming member.

Instead of moving the pipe to cause it to be fed into the feeding member 33, the forming member may be moved into the pipe while the pipe is held stationary. Either method of producing relative axial movement of the pipe and forming member 33 is suitable, as will be understood readily.

We have found in actual practice that the wobbling conical forming member produces a metal working or forging action which is very effective without injury to the pipe. Any type of pipe will be reduced in the manner desired without injury thereto and in a short period of time. In actual practice, our device has worked on all types of ferrous and copper pipe as well as a great variety of pipes made of alloys and has reduced them effectively without injury thereto. It has also been used on welded seam pipe without breaking the seam in the reduction operation, and on thin walled tubing without collapsing the tube.

The invention described herein may be manufactured and used by or for the Government of the United States of America for government purposes without the payment of any royalty thereon or therefor.

Having thus described our invention what we claim as novel and desire to protect by Letters Patent of the United States is:

1. In a machine for reducing tube ends, a forming tool comprising an elongated forming member having a longitudinally extending conical forming chamber formed in one end thereof, a driving member rotatable about a fixed axis, a universal joint coupling the end of said forming member remote from said forming chamber to said driving member at a point on said driving member displaced from said axis of rotation, said forming member being free to move angularly with respect to said driving member, and means associated with said forming member limiting said angular movement to a limited conical region having its apex at said universal joint, said last-mentioned means restricting said forming chamber to positions adjacent said fixed axis.

2. In a machine for reducing tube ends, a forming tool comprising an elongated forming member having a longitudinally extending conical forming chamber disposed in one end thereof, a driving member rotatable about a fixed axis, a universal joint coupling the end of said forming member remote from said forming chamber to said driving member at a point on said driving member displaced from said axis, supporting means surrounding said forming member and secured to said driving member to be rotatable therewith, said supporting means limiting movement of said forming member with respect to said driving member to a conical region having its apex at said universal joint, the end of said forming member including said forming chamber being restrained to positions adjacent said axis.

3. In a machine for reducing tube ends, a forming tool comprising an elongated forming member having a longitudinally extending conical forming chamber disposed in one end thereof, a driving member rotatable about a fixed axis, a universal joint coupling the end of said forming member remote from said forming chamber to said driving member at a point on said driving member displaced from said fixed axis, said universal joint permitting angular movement of said forming member with respect to said driving member, a supporting member having an opening formed therein to receive said forming member, said supporting member being secured to said driving member and rotatable therewith, said opening in said supporting member being disposed with the center thereof substantially on said axis, said opening in said supporting member having a diameter greater than the diameter of said forming member in the region of engagement of said forming member and said supporting member whereby said forming member is free to move with respect to said driving member within a limited conical region having its apex at said universal joint.

4. In a machine for reducing tube ends, a forming tool comprising a driving member and a supporting member disposed in spaced apart relationship along a common axis, said supporting member being secured to said driving member and rotatable therewith about said axis, said supporting member being formed with an opening extending therethrough substantially parallel to said axis, a forming member having a longitudinally extending conical forming chamber disposed in one end thereof, said forming member extending through said opening in said supporting member with the end of said forming member opposite said forming chamber adjacent to said driving member, a universal joint coupling said opposite end of said forming member to said driving member at a point on said driving member remote from said axis, the opening in said supporting member being of sufficient size to permit said forming member to move freely with respect to said driving member within a limited conical region having its apex at said universal joint, the end of said forming member containing said forming chamber being restricted by said supporting member to positions adjacent said axis, said forming member when in engagement with a tube end to be reduced being supported solely by said tube end and said universal joint.

5. A machine for reducing the end of a tube comprising, means for supporting said tube, an elongated forming member formed with a longitudinally extending conical forming chamber in one end thereof, said forming chamber being adapted to receive and engage the tube end to be formed, a driving member rotatable about an axis coincident with the axis of said tube, means securing the end of said forming member remote from said forming chamber to said driving member at a point displaced from said axis of rotation, said securing means permitting angular movement of said forming member relative to said driving member, supporting means associated with said forming member, said supporting member limiting the angular movement of said forming member relative to said driving member to a conical region having its apex at said securing means, and means for moving said tube axially into engagement with said forming member.

6. A machine as in claim 5 wherein said forming member is supported solely by said securing means and said tube end during the forming of said tube end.

HENRY WOLDMAN.
EDWARD D. McDONOUGH.

REFERENCES CITED

The following references are of record in the file of this patent:

UNITED STATES PATENTS

| Number | Name | Date |
|---|---|---|
| 484,135 | Brown | Oct. 11, 1892 |
| 1,696,229 | Fantz | Dec. 5, 1928 |
| 2,325,479 | Crawford | July 27, 1943 |
| 2,325,481 | Crawford | July 27, 1943 |
| 2,325,522 | Lauer | July 27, 1943 |
| 2,341,144 | Hill | Feb. 8, 1944 |
| 2,346,266 | Mentley | Apr. 11, 1944 |
| 2,357,110 | Heineman | Aug. 29, 1944 |